July 11, 1933.  A. M. JOHNSON  1,917,842
DRILLING MACHINE SPINDLE
Original Filed Oct. 10, 1929
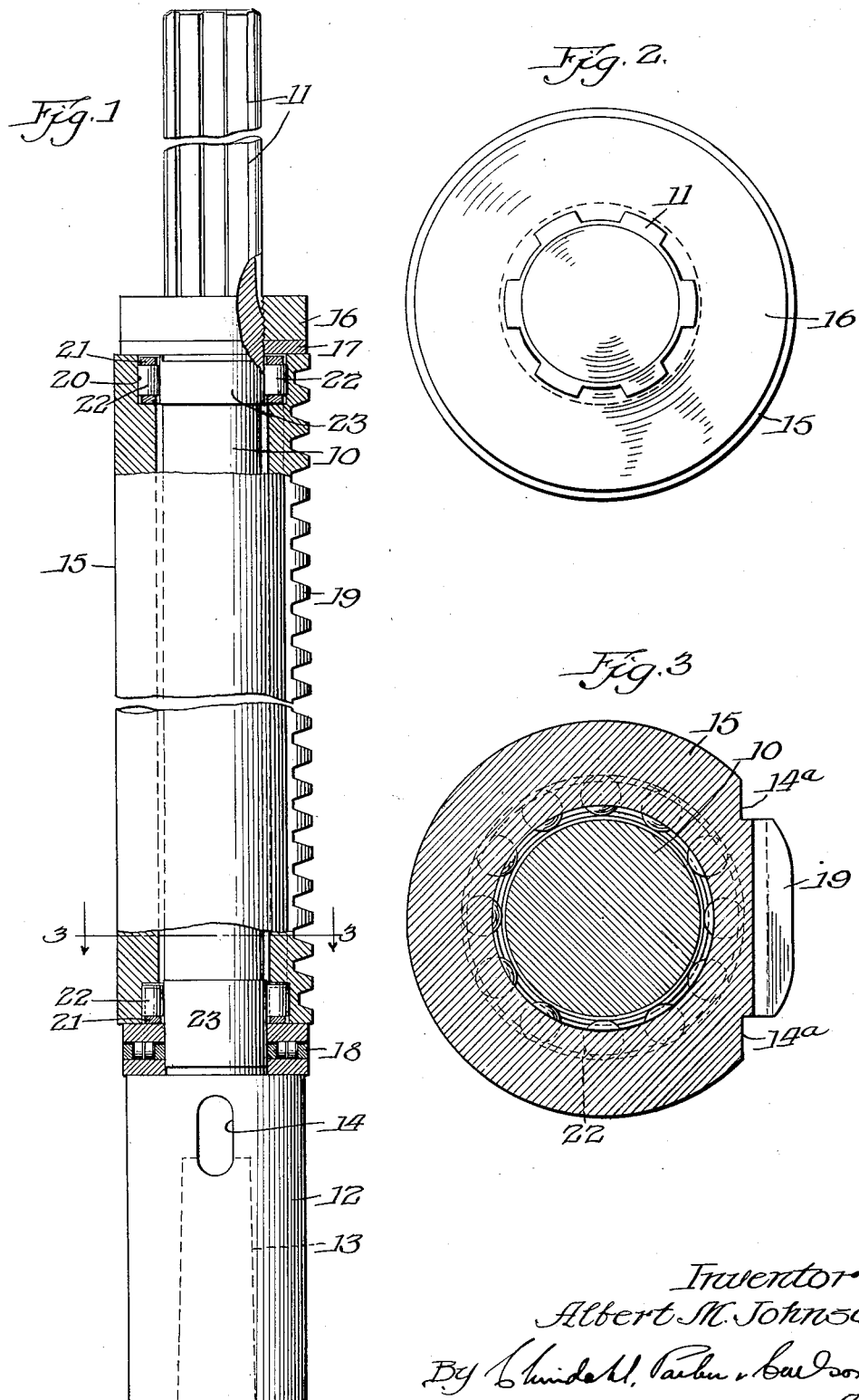
Inventor:
Albert M. Johnson.
By Chindall, Parker, Carlson
Attys Patented July 11, 1933

1,917,842

UNITED STATES PATENT OFFICE

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS

DRILLING MACHINE SPINDLE

Original application filed October 10, 1929, Serial No. 398,709. Divided and this application filed March 27, 1931. Serial No. 525,718.

The invention relates to spindle structures for drilling machines and the like, in which the spindle proper is mounted for rotation in a non-rotatable sleeve through the medium of which the drill or other cutting tool is fed to the work.

In the case of prior spindle structures of the character referred to it has been customary in the construction of the parts to employ a relatively soft steel such as would permit of proper machining; and as an incident to this characteristic of the metal, separately formed and hardened raceways have been employed between opposite ends of the spindle and the sleeve.

These prior spindle structures have been subject to the objection that due to the use of such relatively soft metal, they do not possess sufficient strength and rigidity to withstand the extreme pressures and resultant bending strains to which they are in some instances subjected, as in the case of hydraulic drill presses; and moreover they do not properly resist wear. It has thus been necessary frequently to repair and to replace damaged spindle units.

The object of the present invention is to provide a novel spindle structure such that it shall possess substantially greater strength than prior spindle structures and greater wear resisting qualities than has been possible to obtain heretofore.

In the accompanying drawing wherein I have shown a preferred embodiment of my invention:

Figure 1 is a fragmentary side elevational view of a spindle structure with parts broken away to show details of construction.

Fig. 2 is a plan view of the structure shown in Fig. 1 but on a larger scale.

Fig. 3 is a transverse sectional view taken approximately in the plane of line 3—3 of Fig. 1 and also on a larger scale.

In the spindle structure shown, 10 designates the spindle proper with splined grooves 11 at its upper end for driving purposes, and having at its lower end the usual drill chuck 12. The latter has the customary taper socket 13 and a transverse drift pin hole 14 at the upper end of the socket.

15 designates the spindle sleeve held against longitudinal movement relative to the spindle in any preferred manner. As shown, a collar 16 is threaded onto the spindle above the sleeve with a washer 17 interposed between it and the sleeve. Between the lower end of the sleeve and the chuck 12 is interposed a thrust bearing 18 of suitable character. A feeding rack 19 is, as shown, formed integral with the sleeve at one side thereof, grooves 14ª being formed at opposite sides of this rack to receive guide rollers (not shown) which serve to hold the sleeve against rotation when mounted in the machine.

In order to lend greater strength to the spindle structure and to increase its durability, I employ a mode of manufacture in which the spindle and sleeve are first machined and then hardened by means of a suitable non-warping process so that the spindle unit possesses not only much greater strength and rigidity than prior spindle units, but also much higher wear resisting qualities. Thus, I preferably employ in both of said parts a special alloy steel such, for example, as that known to the trade as "Nitralloy", and after the parts are properly machined I subject them to the action of ammonia gas under low temperatures, a process known as the "nitriding" process.

The use of a relatively costly alloy steel and special hardening process in place of the more ordinary materials and process heretofore used would, with the construction and arrangement heretofore employed, be practically prohibitive from the standpoint of cost of manufacture. I have overcome this difficulty, however, by forming raceways integrally with the sleeve and the spindle, between which raceways are interposed antifriction bearings of the roller type. Moreover, I have arranged the bearings almost wholly within the ends of the sleeve, only small portions of the bearing elements projecting into the sleeve for coaction with inner raceways formed on the spindle. The result is that I have not only been able to eliminate separate case-hardened parts providing the raceways heretofore employed, but I have been able to reduce the diameter of the sleeve with a resultant saving in material.

Referring now to the drawing, the sleeve 15 has an internal diameter only slightly greater than the diameter of the spindle, and each end of the sleeve is counterbored to form an annular groove providing the outer raceway 20. Within this groove is inserted a cage 21 which is in the form of a ring provided with sockets at spaced points to receive roller bearings 22 which engage throughout their lengths with the outer raceway and hence provide a large bearing surface. The inner raceway with which said rollers coact is formed directly on the spindle, preferably on a somewhat enlarged cylindrical portion 23, the rollers being of a diameter slightly greater than the thickness of the ring forming the cage. The upper bearing is held in position in the sleeve by means of the nut and washer 16, 17, and the lower bearing is retained by the antifriction thrust bearing 18.

It will be seen that I have provided a spindle structure possessing substantially greater strength and rigidity as well as greater durability, than prior structures, and that I have accomplished this result by a construction and arrangement which, through the elimination of parts necessarily employed in prior structures, and by a substantial reduction in the amount of material necessary to be employed is not rendered impracticable on account of the use of special materials or processes. Moreover, by reason of the fact that all machining operations may be completed before heat treating, the cost of manufacture is reduced. And a more durable structure is obtained as compared to prior structures in which the grinding operation, which necessarily follows heat treating in order to remove warpage, also results in the removal of the case.

This application is a division of my co-pending application Serial No. 398,709, filed October 10, 1929.

I claim as my invention:

A spindle structure for drilling machines and the like comprising a spindle, a sleeve having an internal diameter only slightly greater than the spindle, means on the spindle coacting with opposite ends of the sleeve to hold it against longitudinal movement but permitting relative rotation, said sleeve having a pair of internal annular grooves respectively formed at opposite ends, and roller bearings held in circumferentially spaced relation in said grooves and bearing directly against the peripheral walls of the grooves and against the adjacent peripheral surfaces on the spindle, said spindle and sleeve being made of an alloy steel hardened throughout their lengths by a non-warping process such as nitriding.

In testimony whereof, I have hereunto affixed my signature.

ALBERT M. JOHNSON.